United States Patent [19]

Falkinger et al.

[11] Patent Number: 5,036,597
[45] Date of Patent: Aug. 6, 1991

[54] SECURING DEVICE FOR MEASURING APPARATUS

[75] Inventors: Bernhard Falkinger, Nussdorf; Reinhold Schopf, Altenmarkt, both of Fed. Rep. of Germany

[73] Assignee: Dr. Johannes Heidenhain gmbH, Traunreut, Fed. Rep. of Germany

[21] Appl. No.: 625,709

[22] Filed: Dec. 11, 1990

[30] Foreign Application Priority Data

Jun. 15, 1988 [DE] Fed. Rep. of Germany ....... 3820331

[51] Int. Cl.$^5$ ...................... G01B 21/00; B65D 85/38
[52] U.S. Cl. ........................................ 33/706; 33/700; 33/707; 33/708
[58] Field of Search ................. 33/700, 706, 707, 708, 33/710, 711

[56] References Cited

U.S. PATENT DOCUMENTS 3,833,303 9/1974 Burns et al. ........................ 356/169
4,509,262 4/1985 Nelle .
4,663,853 5/1987 Indo et al. ............................ 33/707

FOREIGN PATENT DOCUMENTS 2349944 4/1974 Fed. Rep. of Germany .
2845224 4/1979 Fed. Rep. of Germany .
3020003 1/1983 Fed. Rep. of Germany .

OTHER PUBLICATIONS

Sony Magnascale Instruction Manual, pp. 4, 15, 16 Sony Magnascale Inc., 1987.

Primary Examiner—William A. Cuchlinski, Jr.
Assistant Examiner—Alvin Wirthlin
Attorney, Agent, or Firm—Toren, McGeady & Associates

[57] ABSTRACT

A securing device composed of a plurality of components for a measuring apparatus used for determining the positions of two structural members which are movable relative to each other. The measuring apparatus includes a graduation, a carrier member carrying the graduation and a scanning device for scanning the graduation. The scanning device is guided at a constant distance from the graduation. The scanning device is fastened to one of the movable structural members by means of an assembly base. Spacer members are used for maintaining the securing device in an intended position relative to the carrier member. Each component of the securing device is a unit which can be separately attached to the carrier member. The components include interacting elements for connecting the components in a securing position.

9 Claims, 2 Drawing Sheets

SECURING DEVICE FOR MEASURING APPARATUS

This is a continuation of Ser. No. 07/348,565 filed May 5, 1989, abandoned.

BACKGROUND OF THE INVENTION

1. Field of the Invention

The present invention relates to a securing device or lock device composed of a plurality of components for a measuring apparatus. The measuring apparatus is used for determining the positions of two structural members which are movable relative to each other. The measuring apparatus includes a graduation, a carrier member carrying the graduation and a scanning device for scanning the graduation. The scanning device is guided at a constant distance from the graduation. The scanning device can be fastened to one of the movable structural members by means of an assembly base. The assembly base is maintained by the securing device in its intended position relative to the carrier member by means of spacer members.

2. Description of the Related Art

Securing devices of the above-described type are particularly used for the transport and assembly of measuring apparatus in order to protect the sensitive structural members of the measuring apparatus and in order to enable the user to mount the measuring apparatus on a machine without problems. Generally, the securing devices are used by machine tool manufacturers.

A securing device of this type is disclosed in German Offenlegungsschrift 23 49 944 which is based on U.S. Pat. No. 3,833,303. An alignment arm is screwed to a beam and to a housing and serves to accurately position the housing relative to the beam and, thus, relative to a scale. Since screwed connections are used, the alignment arm can be used repeatedly.

Moreover, German patent 30 20 003 discloses a two-part securing device which is clamped by means of screws to the end faces of an assembly base of a hollow member and thereby secures the assembly base against accidental displacement.

The known securing devices have the disadvantage that the individual securing elements have to be screwed to the assembly base or to the hollow member.

It is, therefore, the primary object of the present invention to provide a securing device of the above-described type which is composed of simple components and can be easily assembled.

SUMMARY OF THE INVENTION

In accordance with the present invention, each component of the securing device is a unit which can be separately attached to the carrier member. The components include means which interact in order to connect the components in a securing position.

The securing device according to the present invention has the particular advantage that the components thereof may be simple injection molded components of plastics material which can be individually fastened to the carrier member. By a simple joining of two components of the securing device, the assembly base is grasped at the end face thereof and is secured.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENTS

Figure 1:
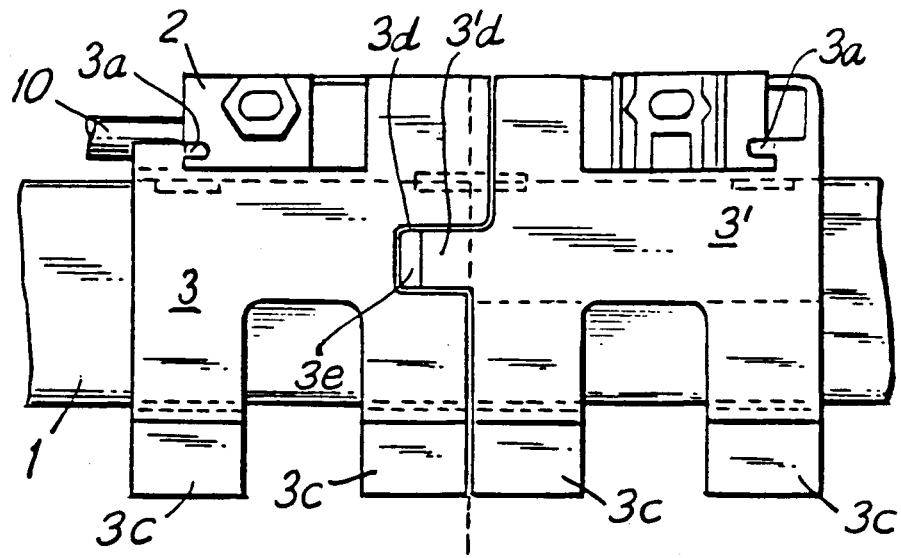
FIG. 1 is a schematic elevational view of a securing device according to the present invention mounted on a measuring apparatus which is partially illustrated.

FIG. 1 of the drawing shows a portion of a U-shaped hollow member 1 of a longitudinal measuring apparatus. An assembly base 2 extends out of the hollow member 1. Components 3 and 3' of a securing device are mounted on both sides of the assembly base 2. Components 3 and 3' include lugs (spacer members) 3a which engage in recesses defined in assembly base 2 and, thus, components 3 and 3' support the assembly base 2 at a sufficiently accurate distance relative to the hollow member 1.

Figure 2:
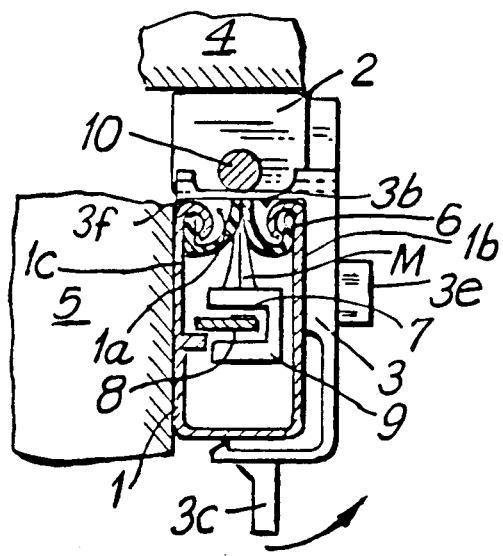
FIG. 2 is a side view of the device of FIG. 1.

The longitudinal measuring apparatus is used for determining the positions of two structural members 4 and 5 which are movable relative to each other, as shown in FIG. 2 of the drawing. As further shown in FIG. 2 of the drawing, the measuring apparatus includes elastic sealing lips 6, a graduation 7, a carrier member 8 for carrying the graduation 7 and a scanning device 9 for scanning the graduation 7. A cable 10 extends through assembly base 2.

The lugs 3a are mounted on the components 3, 3' of the securing device in such a way that it is ensured that they are always mounted facing the correct side.

As shown in FIG. 2, the components 3, 3' are anchored in a longitudinal slot 1a of the hollow member 1 by means of projections 3b. Resilient lugs 3c surround the hollow member 1. The projections 3b effect a positively locking connection and the resilient lugs 3c effect a frictionally engaging connection.

The assembly base 2 can be displaced by applying a modest force. However, when vibrations and accelerations occur during transport, the assembly base 2 remains fixed in its position relative to hollow member 1.

The two components 3 and 3' have interacting means in the form of a looking projection 3'd at component 3' and a recess 3d at the other component 3 of the securing device. Locking projection 3'd and the recess 3d serves to lock the components 3, 3' together. The locking projection 3'd has at its end an attachment 3e' for manually unlocking the components 3 and 3'.

The connected components 3, 3' of the securing device maintain each other in the securing position, so that an additional fixing in longitudinal direction is unnecessary.

The two components 3 and 3' are assembled by clipping them onto the hollow member 1 to the left and right of the assembly base 2. The components 3 and 3' are then slid toward the assembly base 2 against the end faces thereof until the adjusting lugs 3a support the assembly base 2 in the correct position. In this position, the locking projection 3'd engages in the recess 3d and the securing device is fully assembled.

For the disassembly of the securing device, the two components 3 and 3' are manually unlocked by means of the attachment 3e and the two components 3 and 3' are removed from the assembly base 2.

Figure 3:
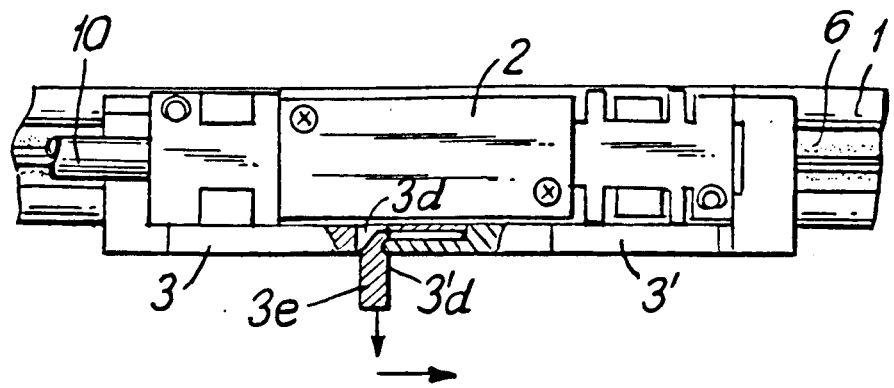
FIG. 3 is a top view of the device of FIG. 1.

FIGS. 2 and 3 of the drawing are a side view and a top view, respectively, of the assembled securing device according to the present invention shown in FIG. 1.

Figure 4:
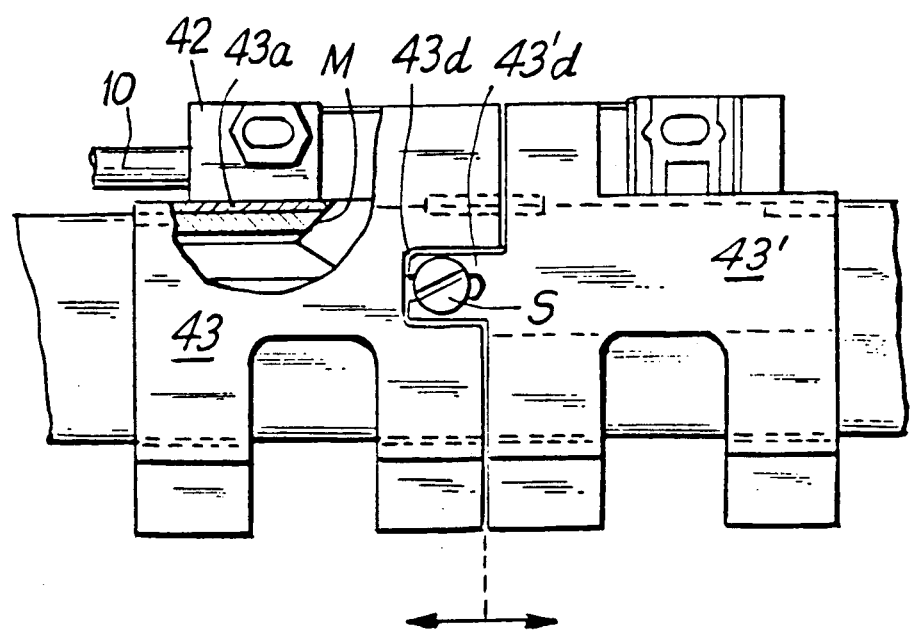
FIG. 4 is an elevational view, partly in section, of another embodiment of the securing device according to the present invention.

In the embodiment of the present invention illustrated in FIG. 4, the interacting means and the adjusting lugs are constructed differently. All those elements which are the same as those shown in FIG. 1 are not provided with reference numerals in FIG. 4.

Component 43 of the securing device of FIG. 4 includes a receiving pocket 43d which is capable of receiving on its side facing the hollow member a threaded nut in the form of an insert nut. Of course, it is also possible to cut a thread in the wall of the receiving pocket 43d. A slotted projection 43'd forms the member opposite the threaded nut. The slotted projection 43'd extends to the receiving pocket 43d. A screw S is screwed through the slot of the projection 43'd into the thread of the nut, so that the two components 43 and 43' of the securing device are fixedly connected to each other in the securing position. When the screw S is unscrewed, the components 43 and 43' of the securing device can be pulled off the assembly base and removed from the hollow member.

Of course, the screw shown in FIG. 4 can also be replaced by another locking element, such as, an eccentric member or a bayonet-type connection.

In the embodiment of FIG. 4, the assembly base is adjusted by means of plate member 43a which act underneath the assembly base 42 projecting from the hollow member on a drive member M having an inclined side surface which, in the known manner, connects the assembly base to the scanning device in the interior of the hollow member, not illustrated in detail.

When the components 3, 43 or 3',43' are removed from the hollow member 1, a web member 3f of the respective component rests on a side member 1c of the hollow member 1. The side member 1c is located opposite a side member 1b, so that the side members 1b and 1c define the longitudinal slot 1a.

While specific embodiments of the invention have been shown and described in detail to illustrate the application of the inventive principles, it will be understood that the invention may be embodied otherwise without departing from such principles.

We claim:

1. In a securing device composed of a plurality of components for a measuring apparatus for determining the positions of two structural members which are movable relative to each other, the measuring apparatus including a graduation, a carrier member carrying the graduation and a scanning device for scanning the graduation, wherein the scanning device is guided at a constant distance from the graduation, the scanning device including an assembly base adapted to be fastened to one of the movable structural members, the securing device including spacer members for maintaining the assembly base in an intended position relative to the carrier member, the improvement comprising each of the components of the securing device being a unit which can be separately attached to the carrier member, the components of the securing device being connected to each other in a securing position by means of locking elements provided on the components, the assembly base having ends, each end having a recess, each spacer member being a lug which is mounted on each of the components, the lugs engaging the recesses for supporting the assembly base in a correct position.

2. The securing device according to claim 1, wherein the locking elements are a locking projection on one of the components and a recess defined on another of the components.

3. The securing device according to claim 1, wherein the locking elements are a slotted projection capable of receiving a screw formed on one of the components and a receiving pocket for said slotted projection defined on another of the components.

4. The securing device according to claim 1, further comprising positively locking elements for fixing the components to the carrier member.

5. The securing device according to claim 4, wherein the carrier member is a U-shaped hollow section, the hollow section having a side member defining a longitudinal slot, the positively locking elements being projections which act on the side member.

6. The securing device according to claim 5, wherein the longitudinal slot is further defined by another side member, the longitudinal slot being located opposite to the projections, the projections being integrally formed with a web member for supporting the components on the another side member.

7. The securing device according to claim 1, further comprising frictionally engaging elements on each component for fixing the components to the carrier member.

8. The securing device according to claim 7, wherein the carrier member is a hollow section, the frictionally engaging elements being resilient lugs which partially surround the hollow section.

9. The securing device according to claim 1, wherein the assembly base including the securing device is mounted on the carrier member in a self-locking manner, wherein the assembly base is movable by the application of an external force.

* * * * *

UNITED STATES PATENT AND TRADEMARK OFFICE
CERTIFICATE OF CORRECTION

PATENT NO. : 5,036,597
DATED : August 6, 1991
INVENTOR(S) : Bernhard Falkinger

It is certified that error appears in the above-identified patent and that said Letters Patent is hereby corrected as shown below:

On the title page, items [73] and [60] should read as follows:

[73] Assignee: Dr. Johannes Heidenhain GmbH, Traunreut, Fed. Rep. of Germany

[60] Continuation of Ser. No. 348,565, May 5, 1989, abandoned.

Signed and Sealed this

Fourth Day of May, 1993

Attest:

MICHAEL K. KIRK

Attesting Officer

Acting Commissioner of Patents and Trademarks